June 10, 1969  R. J. KELLER III  3,448,768
WATER FIXTURE
Filed May 19, 1966  Sheet 2 of 3
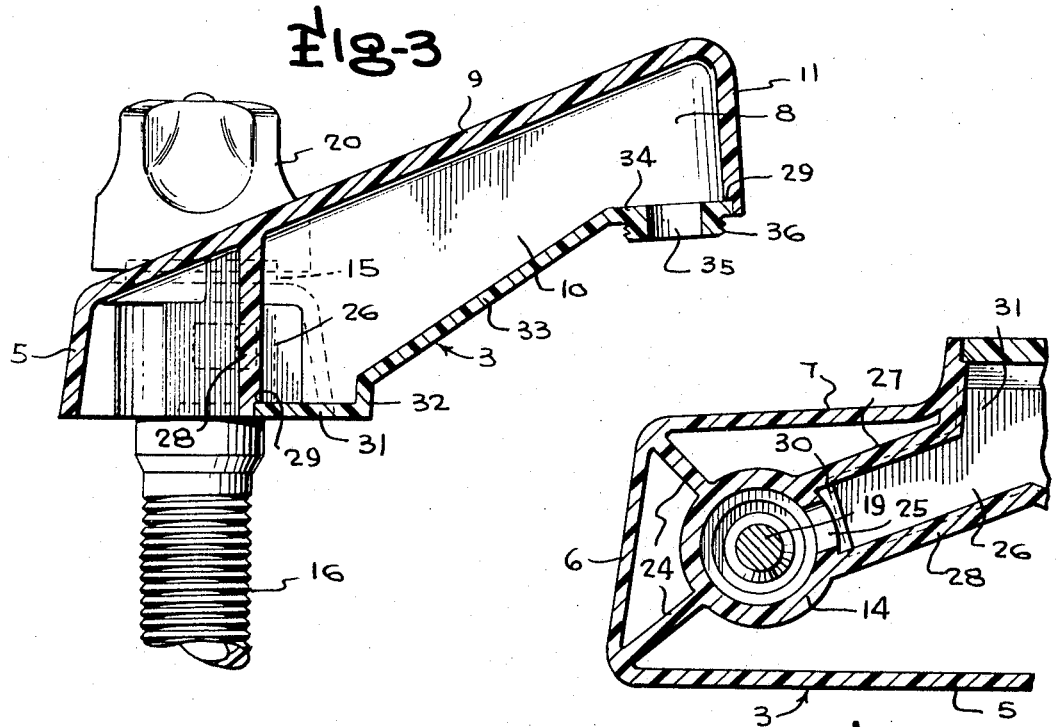
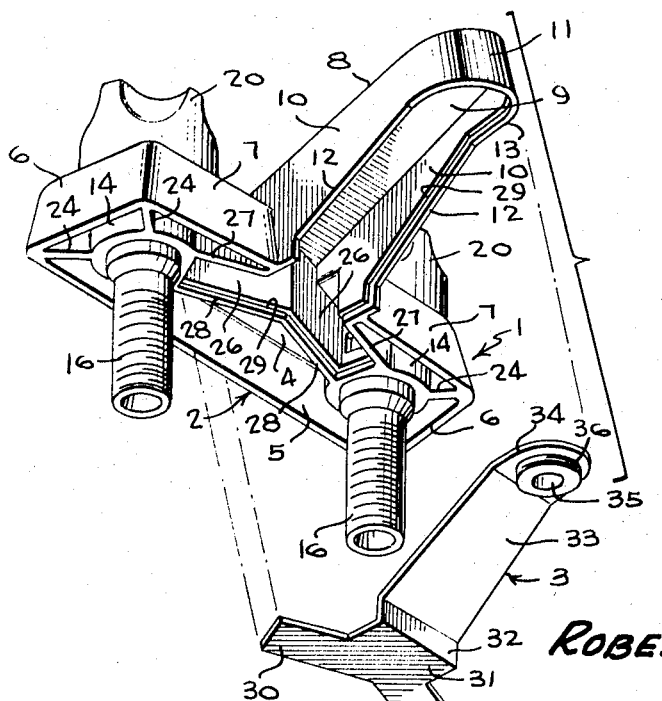
INVENTOR
ROBERT J. KELLER III
BY Mason, Fenwick & Lawrence
ATTORNEYS

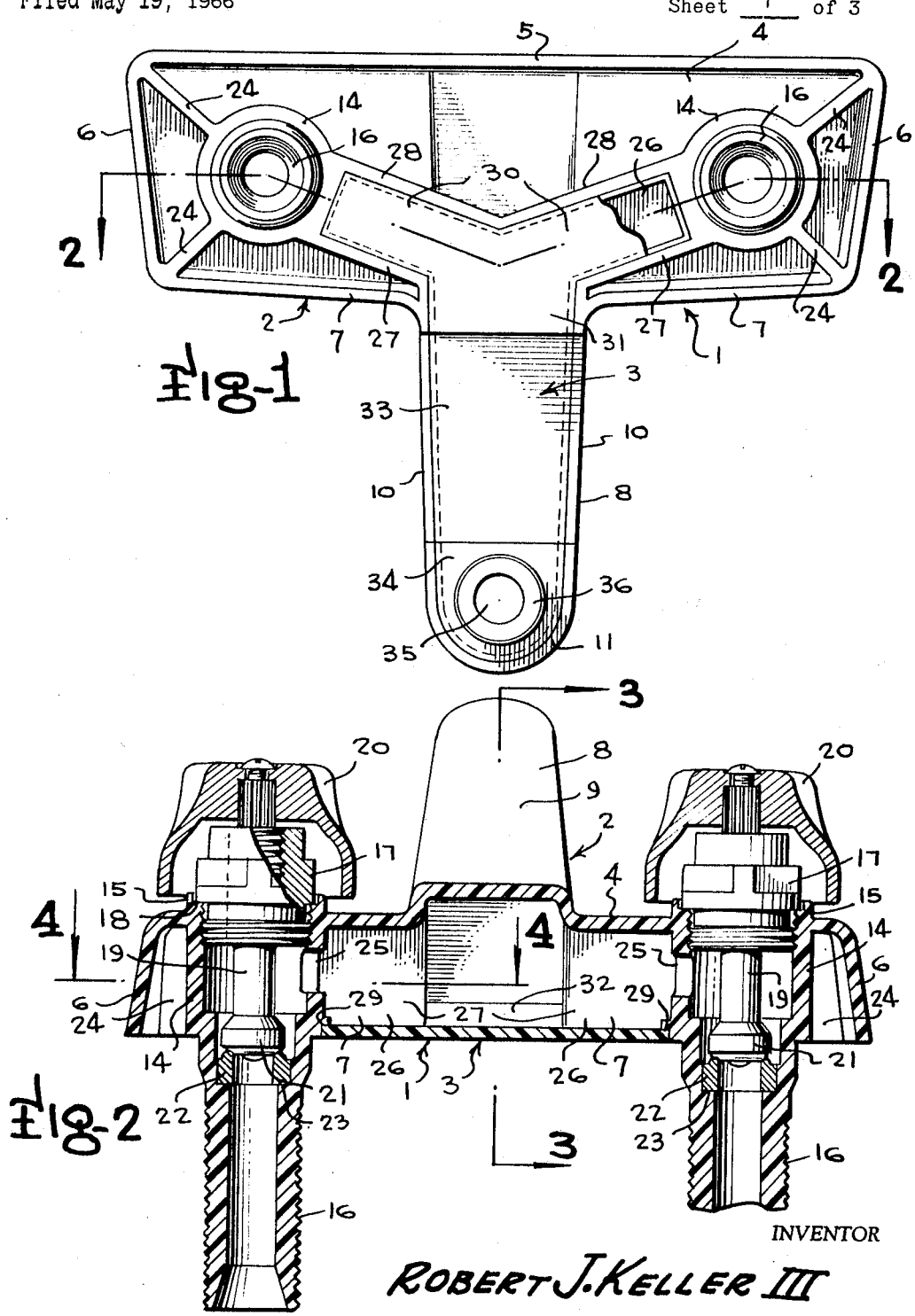

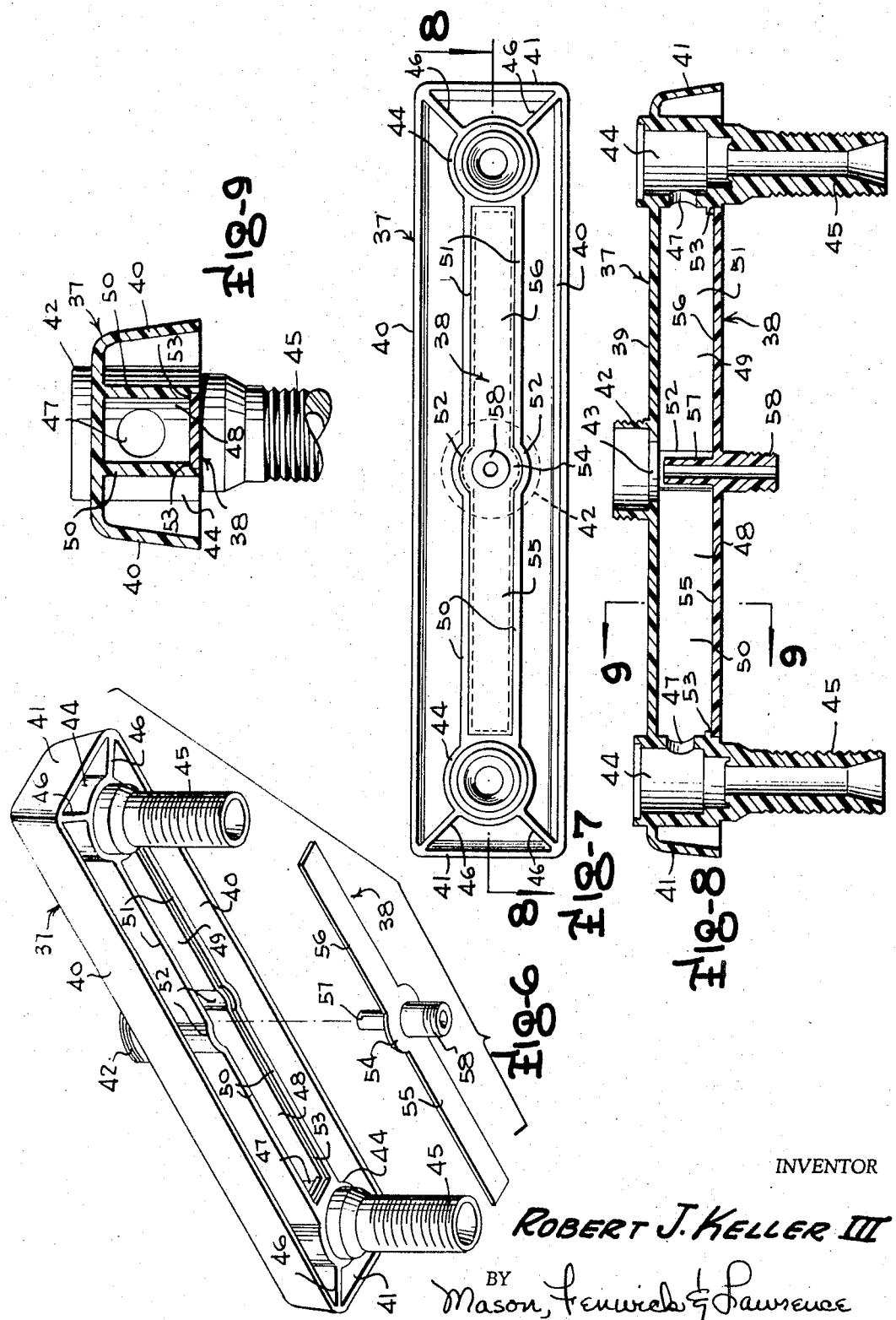

United States Patent Office 3,448,768
Patented June 10, 1969

3,448,768
WATER FIXTURE
Robert J. Keller III, Rte. 3, Chester, Va. 23831
Filed May 19, 1966, Ser. No. 551,396
Int. Cl. E03b 7/07; B05c 5/02
U.S. Cl. 137—606                    3 Claims

ABSTRACT OF THE DISCLOSURE

An easily manufactured, economical water fixture comprising a molded plastic cover member and underbody, the cover member having inwardly spaced depending wall portions on its undersurface forming a water channel extending from an inlet in each end of the cover member to an outlet spout medially of the cover member, the underbody being snap-fitted with the walls of the water channel and bridging the open bottom thereof to form closed water passageways from the inlets to the outlet.

---

This invention relates to water fixtures, and more particularly to such fixtures wherein hot and cold water valve controls are included in the single unit, or set.

In recent years, considerable interest has been shown in water fixtures which incorporate interconnected molded piping and valve members covered with a metal casing or hood. In most instances, the metal casing will also include a spout, or have a metal spout attached to it. This type of unit is much less expensive than the old type fixture, but it still requires the assembly of a number of parts, such as valves, piping, cover, etc.

The general object of the present invention is to provide a fixture of the general nature set out above, wherein the cover is a molded member incorporating its own water channels and valve bodies.

A more specific object of the invention is to provide a fitting which includes a molded cover of plastic, or similar material, metallically coated or plated, on its exposed surfaces and including integral valve bodies and water passages.

Another object of the invention is to provide a molded fitting of the type mentioned, wherein the passages for water are formed as part of the cover, but are open at the bottom. A closure plate, which can be sealed to the cover molding, closes the passages and makes them water tight.

A still further object of the invention is to provide a fitting which is a two-part molded unit, with one part forming the cover and defining the water passages and the other part providing a closure for the water passages in the first molded member.

Other objects of the invention will become apparent from the following description of preferred and practical embodiments thereof, when taken in conjunction with the drawings which accompany, and form part of, this specification.

In the drawings:

FIGURE 1 is a bottom plan view of a water fixture constructed in accordance with the principles of the present invention;

FIGURE 2 is a vertical section taken on the line 2—2 of FIGURE 1;

FIGURE 3 is a vertical section through the fixture at the spout, and is taken on the line 3—3 of FIGURE 2;

FIGURE 4 is a partial horizontal section through the fixture, taken on the line 4—4 of FIGURE 2;

FIGURE 5 is an exploded perspective view of the unit, showing the principal molded member from the underside, with the closure member spaced below it;

FIGURE 6 is also an exploded perspective view, showing a modified type of fixture suitable for kitchen sink use;

FIGURE 7 is a bottom plan view of the unit shown in FIGURE 6;

FIGURE 8 is a vertical, longitudinal section through the unit, taken on the line 8—8 of FIGURE 7; and FIGURE 9 is a vertical transverse section taken on the line 9—9 of FIGURE 8.

In general, the invention is concerned with a plumbing fixture, such as a faucet unit, which is of two-part molded construction. The main molded member incorporates the fixture housing, valve bodies and water channels, and in some instances the outlet spout; the second member constitutes a closure for the water channels molded within the first member. The two members can be fitted together and sealed around their lines of juncture to form a leakproof fixture.

Referring first to that form of the invention shown in FIGURES 1 through 5, there is shown a lavatory center set fitting 1, which includes a cover mold member 2 and an underbody 3. These two units are joined, and sealed, as will be described.

The cover mold member 2 is of generally rectangular shape, although it may deviate from this contour as desired for pleasing appearance, and has a generally flat top wall 4 and an unbroken, downwardly and outwardly sloping back wall 5. It has also downwardly and outwardly sloping end walls 6, and a downwardly and outwardly sloping front wall 7, which is broken at its center by an inclined spout 8. The spout begins to incline from the top of the cover adjacent the back wall, and includes a top wall 9 and side walls 10. The spout terminates at its front in a generally semi-circular wall 11. Thus, the spout is of inverted channel shape. The bottom edges of the side walls 10 of the spout incline outwardly, as at 12, to a point spaced from the front wall 11. From this point forward, the bottom edges of the side walls are horizontal, as shown at 13.

Adjacent each end of the cover there is a cylindrical valve body 14. Each valve body projects through the top wall 4 of the cover to provide an upstanding collar 15. The valve body is of uniform outer diameter from the top of the collar to the plane of the bottom of the body, and from this point it is of reduced diameter to form a depending nipple 16, which is threaded on its outer surface to receive the normal coupling for connection to a water pipe. The valve body is internally threaded near its top to receive a conventional valve barrel 17, which, where threaded into the valve body comes to rest upon a seat 18 in the upstanding collar. Valve stem 19 is threaded within the barrel, and has means at its top for connection to a standard operating handle 20. The stem carries a valve proper 21, at its lower end, which is engageable with a valve seat 22, fitted within, and resting upon, a shoulder 23 internally of the nipple 16. The valve bodies may be suitably braced by webs 24, which extend from the corners of the cover member radially to the valve bodies.

Valve bodies 14 have water outlet openings 25 in their side walls, which permit flow of water from the water supply lines, through nipples 16, into water channels 26 formed within the cover member. The channels are formed by vertical front and back wall members 27 and 28, respectively, which are parallel to one another and extend from the top wall 4 of the cover to the plane of the cover bottom. The back walls slope at opposite angles from the valve bodies toward the front of the unit and join one another at the center of the unit. The front walls are joined to the back ends of the side walls 10 of the spout. This forms a Y-shaped conduit, with the arms of the Y formed by the channels 26 extending radially from the valve bodies 14, and the stem of the Y being the spout 8. The side and front walls of the spout, and the front and back walls of channels 26, are each recessed on their inner faces adjacent the bottom edges to form a seat 29 for the underbody 3.

The underbody, for the most part, is a member of uniform thickness. It is Y-shaped to conform to the general configuration of the water passages in the cover member, as described above. Referring particularly to FIGURES 1, 3 and 5, it will be seen that the underbody comprises arms 30, to underlie the channels 26 and 27, and a forward extension 31 to underlie the base portion of the spout. From the outer end of extension 31, the underbody rises vertically, as shown at 32, to provide a vertical step from the bottom of the cover to the base of the inclined spout 8. The underbody then continues as an inclined panel 33, coextensive with the open bottom of the inclined portion 12 of the spout. A horizontal section 34, which has a curved front edge and is adapted to bridge the space between the horizontal portions of the side walls of the spout and the curved front wall forms the terminal panel of the underbody. The horizontal front section, or panel, 34, has a downwardly directed opening 35 forming a water outlet for the fixture. The panel may have a threaded boss 36 about the outlet, so that a filter of conventional form may be mounted at the outlet. The underbody shape, as just described, is such that the underbody will bridge the side walls of the water channels and spout, and rest upon the seat 29 to provide a bottom for these respective passageways. The thickness of the underbody is such that its bottom will be flush with the bottom edges of the water channels and spout when the underbody is resting upon seat 29.

As previously mentioned, the cover member 2 and underbody 3 are to be of molded construction. They may be molded of plastic, of such synthetic compounds as polyphenylene, or other materials which lend themselves particularly to injection molding. It is contemplated that at least the exposed surfaces of the body member and the underbody will be electroplated with a suitable metallic material, such as chrome. This will give the fixture a highly polished, metallic appearance. The underbody will be sized to have a close fit within the cover, and when joined the two members can be permanently sealed by sonic welding, or by the application of heat, solvent, or cement around their line of juncture. By this arrangement, only two molded members are required to form a fitting with built-in water passages. This materially reduces the labor required to produce the fitting, and the overall cost of the unit.

Referring now to FIGURES 6 through 9, there is shown a slightly modified fitting, which is known as a kitchen deck fitting, or faucet. This unit differs from that previously described only in those details necessary to provide a fitting for different use. This unit, also, is of two-part construction having a cover member 37 and an underbody 38. Here, again, the cover member has a flat top 39, and outwardly sloping side and end walls 40 and 41. This unit has no integral spout. Instead, there is a cylindrical boss 42 rising from the center of the top wall 39, which has communication with the interior of the cover member by means of an opening 43. The boss 43 is externally threaded to receive a coupling member to secure a swivel type spout to the fitting.

There are valve bodies 44 at either end of the cover member. These are cylindrical members similar to those of the previously described form. Each valve body has a threaded depending nipple 45. Although no internal valve structure has been shown in connection with this form of the invention, it will be understood that the same valve mechanism described will be used. The valve bodies are braced from the outer walls of the cover member by means of brace webs 46, which extend radially from the valve bodies to the corners of the cover. Each valve body has an opening 47 for the outlet of water, communicating with one of the water channels 48 and 49. These channels are in longitudinal alignment and provide water passageways from the valve bodies to the boss 42. The channels are formed by spaced parallel side walls 50 and 51. Adjacent their junctures, the walls 50 and 51 are curved outwardly, as at 52, to form a curved-wall central chamber directly beneath, and concentric with, the boss 42. The bottom edges of the walls 50 and 51, as well as the curved-wall section 52, are recessed to form a seat 53 for the underbody. As in the first described form, the cover member will be an integrally molded unit of plastic, having its exposed walls plated with a suitable metallic plating material.

The underbody 38 of this embodiment is a flat member having a circular central section 54, with oppositely extending wing sections 55 and 56. This will form a cover for the water channels 48 and 49, as well as the circular chamber at the center of the unit. The underbody has a tube 57 rising from the center of the circular section 54, which stands concentrically within the circular chamber of the cover member when the underbody is in place sealing the bottom of the unit. There is also a nipple 58 depending from the underside of the circular section concentric with the tube 57. The tube and nipple receive the valve controls and hose of a conventional spray unit, which are not shown.

The underbody is designed to fit into the cover member, and rest upon seat 53. When in this position, the bottom of the underbody will be flush with the bottom edges of the side walls of the cover. The two molded members of the unit may then be sealed in the manner previously described.

Each of the disclosed fixtures is formed of two molded sections. One section, as here shown the cover member, includes a cove or hood, and integral internal walls which form passageways for water from valve bodies to an outlet. The other member, as disclosed the underbody, provides a closure for the water channels, or passageways, formed in the cover member. When the two members are joined, the unit is complete and there is no necessity for installing separate piping, valves, cover plates, etc. The units are quite inexpensive, and can be made and assembled automatically. The fittings will have an indefinite life, and be free from trouble due to the fact that they are unitary members and the only joint is that between the cover member and the underbody, and when this has been sealed, the unit, in effect, is a one-piece member. The unit combines the finished appearance of metal, with the economy of molded plastic.

While in the above practical embodiments of the invention have been disclosed, it will be understood that the specific details of construction shown and described are merely by way of example, and the invention may take other forms within the scope of the appended claims.

What is claimed is:

1. A water fixture comprising, a molded plastic cover member having top and side and end walls, a cylindrical valve body including a depending threaded nipple portion adjacent each end of the cover member integral with the cover member and open through the top, means forming a water outlet medially of the cover member, spaced walls depending from the top inwardly of the cover side walls defining open-bottomed water channels extending from the valve bodies to the water outlet, the valve bodies having openings communicating with the water channels, and a plastic underbody bridging the open bottoms of the water channels to form closed water passageways from the valve bodies to the outlet.

2. A water fixture as claimed in claim 1, wherein the means forming a water outlet is an open-bottomed spout integral with and projecting from the cover member and in open communication with the water channels, and the underbody has a projection bridging and closing the open bottom of the spout.

3. A water fixture as claimed in claim 2, wherein the underbody has a snap fit with the walls forming the water channel, and the juncture between the water channel walls and the underbody is sealed.

References Cited

UNITED STATES PATENTS

| | | | |
|---|---|---|---|
| 2,474,108 | 6/1949 | Kadish | 137—606 |
| 2,807,280 | 9/1957 | Kittredge | 251—367 X |
| 3,229,710 | 1/1966 | Keller | 137—606 X |

OTHER REFERENCES

British Plastics, Vacuum Metallizing of Plastics, April 1964, pp. 166–170.

WILLIAM F. O'DEA, *Primary Examiner.*

DENNIS H. LAMBERT, *Assistant Examiner.*

U.S. Cl. X.R.

4—192; 29—157.1; 117—107; 118—621; 251—368